Figure 1:
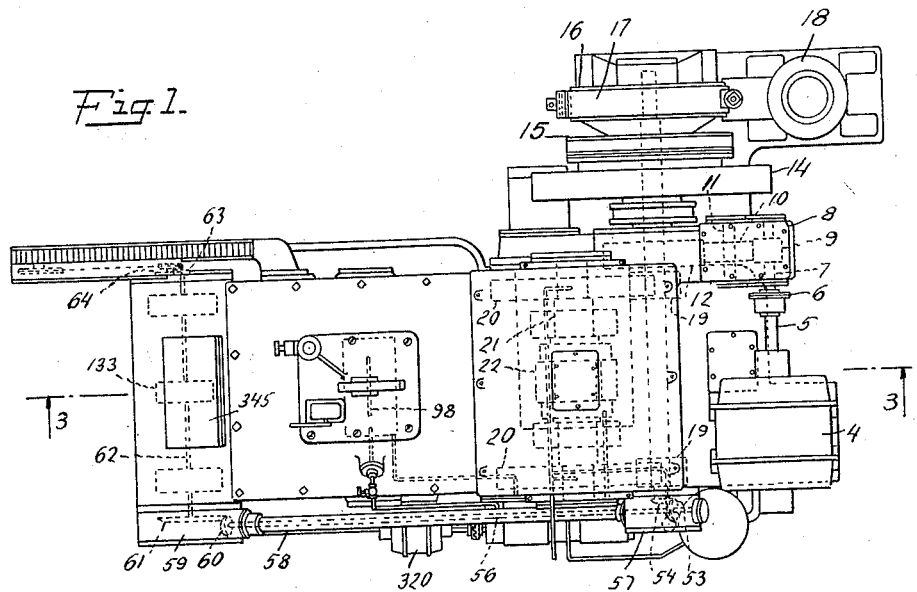

Nov. 1, 1932.     S. W. AVIS     1,885,215
DIAL ARRANGEMENT FOR NUT MAKING APPARATUS
Original Filed June 23, 1928    6 Sheets-Sheet 1

INVENTOR
S. W. AVIS
BY
Pennie, Davis, Marvin & Edmonds
ATTORNEYS

Nov. 1, 1932.                S. W. AVIS                1,885,215
              DIAL ARRANGEMENT FOR NUT MAKING APPARATUS
              Original Filed June 23, 1928    6 Sheets-Sheet 2
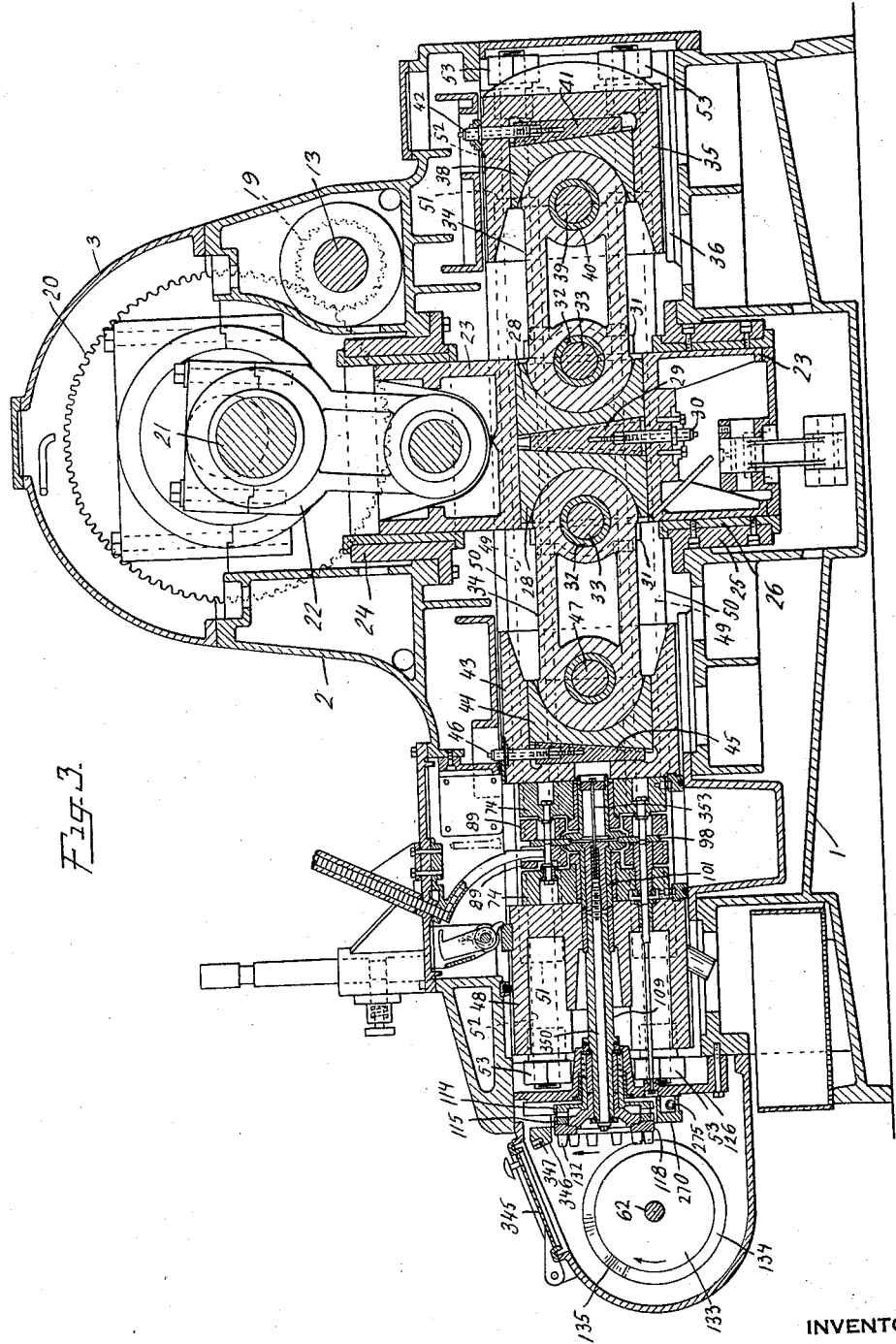
INVENTOR
S. W. AVIS
BY
Pennie, Davis, Marvin & Edmonds
ATTORNEYS Nov. 1, 1932. S. W. AVIS 1,885,215
DIAL ARRANGEMENT FOR NUT MAKING APPARATUS
Original Filed June 23, 1928 6 Sheets-Sheet 3
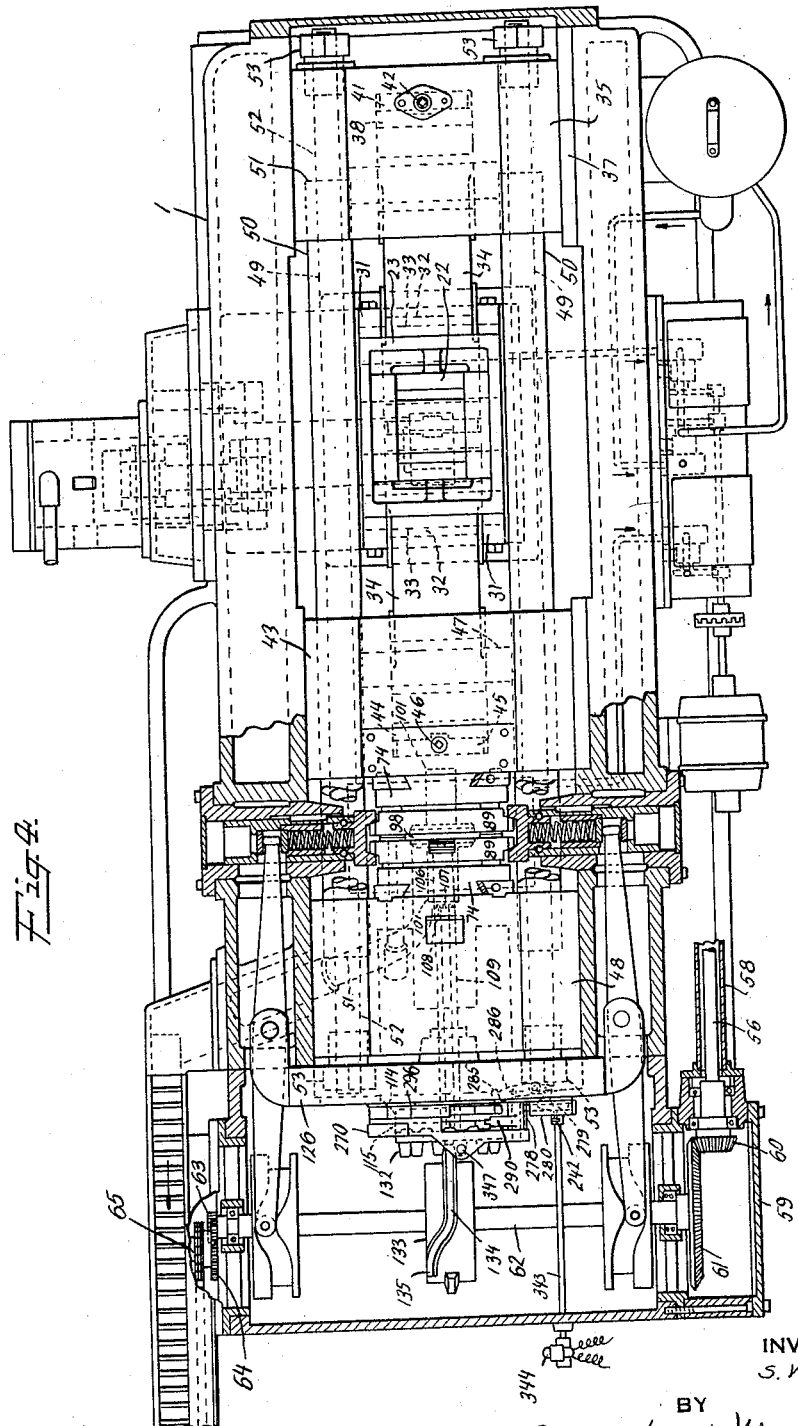
INVENTOR
S. W. AVIS
BY
ATTORNEYS

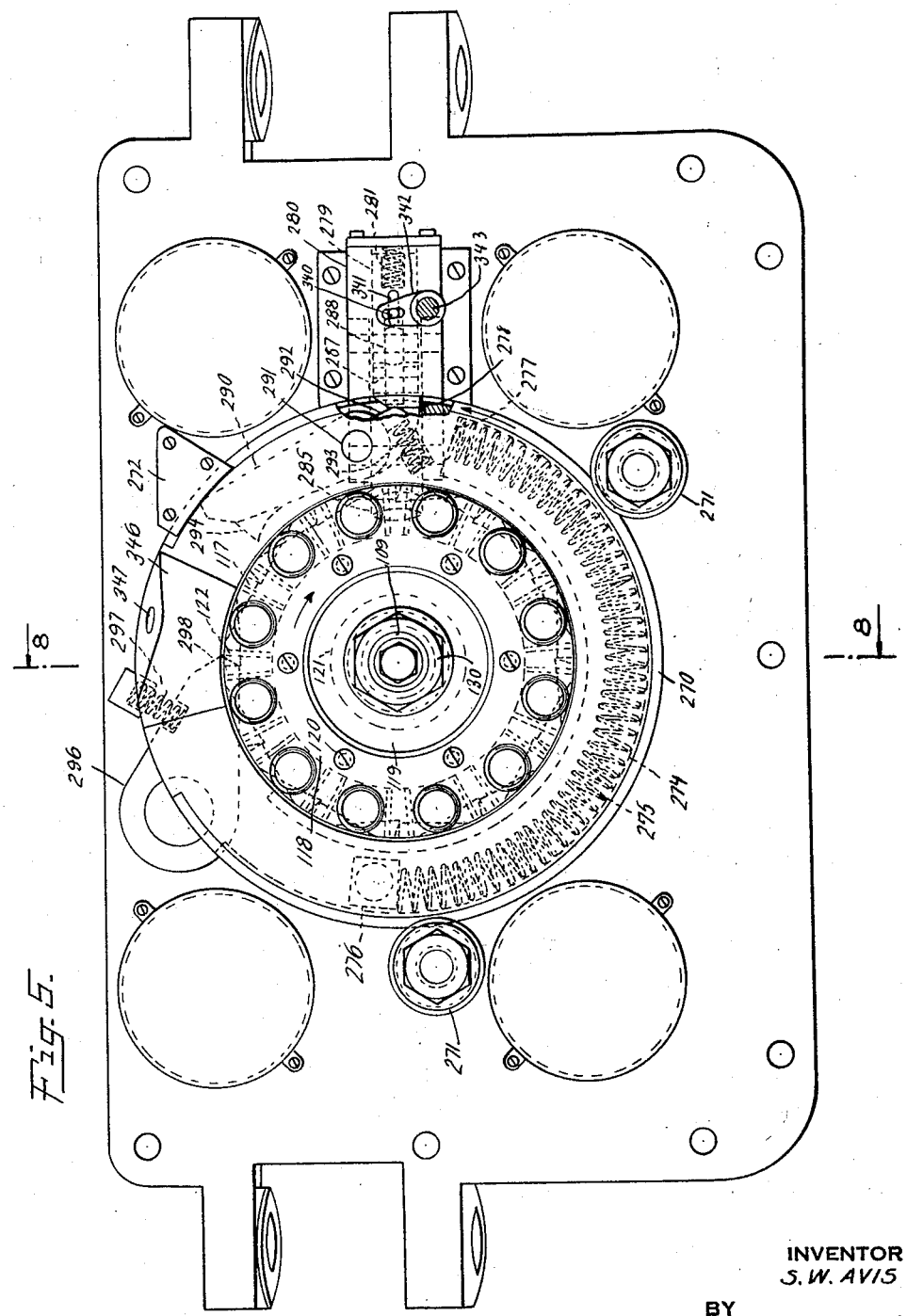

Nov. 1, 1932.  S. W. AVIS  1,885,215
DIAL ARRANGEMENT FOR NUT MAKING APPARATUS
Original Filed June 23, 1928  6 Sheets-Sheet 5
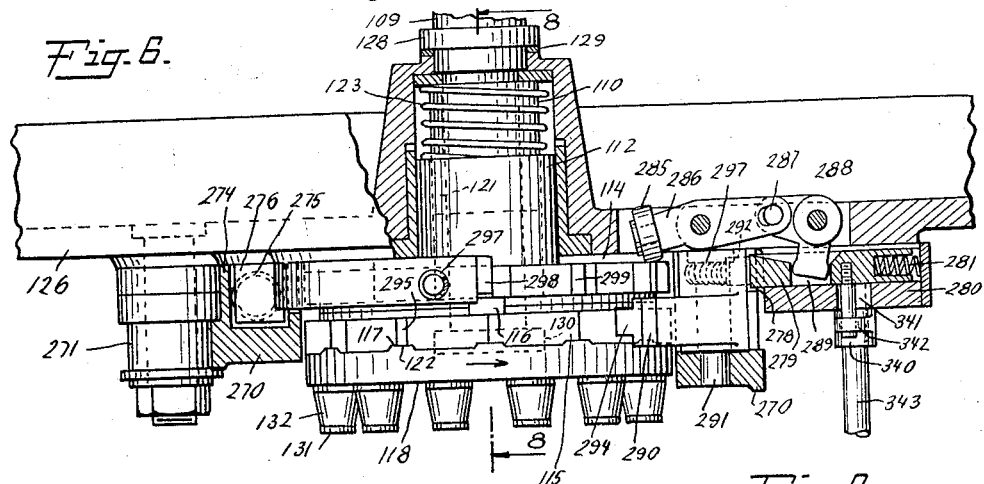
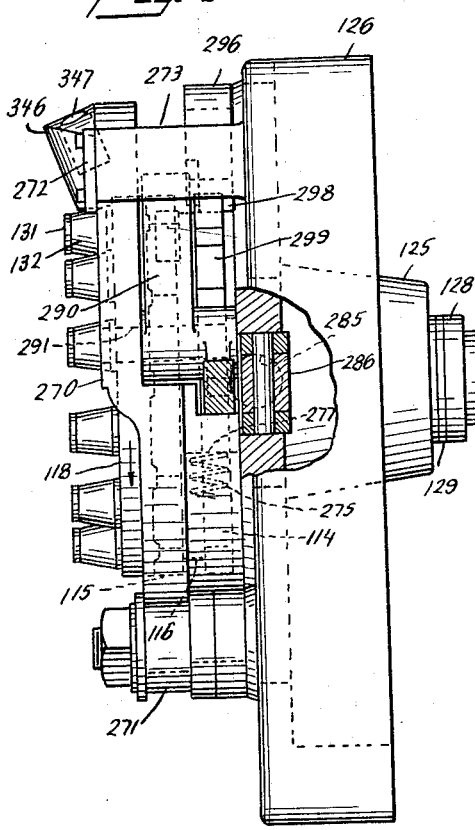
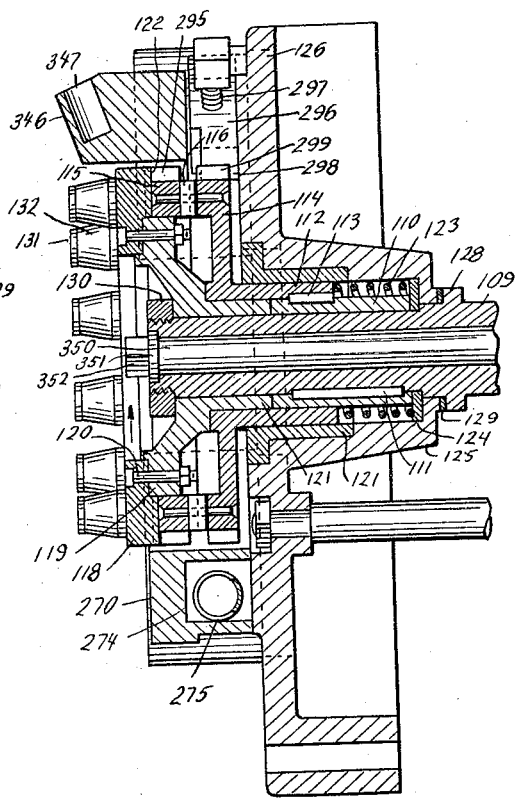
INVENTOR
S. W. AVIS
BY
Pennie, Davis, Marvin & Edmonds
ATTORNEYS Nov. 1, 1932.　　　　S. W. AVIS　　　　1,885,215
DIAL ARRANGEMENT FOR NUT MAKING APPARATUS
Original Filed June 23, 1928　　6 Sheets-Sheet 6

INVENTOR
S. W. AVIS
BY
Pennie, Davis, Marvin & Edmonds
ATTORNEYS

Patented Nov. 1, 1932

1,885,215

UNITED STATES PATENT OFFICE

SAMUEL W. AVIS, OF MILLBROOK, GREENWICH, CONNECTICUT, ASSIGNOR TO RUSSELL, BURDSALL & WARD BOLT & NUT COMPANY, OF PORT CHESTER, NEW YORK, A CORPORATION OF NEW YORK

DIAL ARRANGEMENT FOR NUT MAKING APPARATUS

Original application filed June 23, 1928, Serial No. 287,828, and in Switzerland June 10, 1929. Divided and this application filed March 19, 1930. Serial No. 437,082.

This invention relates to apparatus for forming nut blanks. In my copending application, Serial No. 287,795 filed June 23, 1928, there is described and claimed a process of making nut blanks by cold punching in which the volume of the blank is substantially equal to the volume of the finished nut. The apparatus herein described and claimed is particularly suitable for use in practicing my process.

In the manufacture of nut blanks by the cold punch process now in use, the waste or scrap amounts to substantially 50 percent of the material. As more fully described in my copending application, this waste can be substantially eliminated by forcing outwardly a metal blank of substantially the same volume as the volume of the finished nut to form the central opening of the nut, and produce a blank of the desired size. To carry out this operation on a commercial scale, it is necessary to form the central opening in a series of punching operations, and the present machine is designed for the purpose of performing this series of punching operations simultaneously on a plurality of blanks carried by a dial or other suitable supporting member, said dial having a step by step movement, whereby the production of the machine may compare favorably with the production of a machine of the prior art in which the central opening is formed in a single punching operation.

I accordingly provide a machine consisting of a dial having a plurality of die pockets, together with means for imparting a step by step motion to the dial. A tool holder and stripper block is arranged on each side of the dial and means are provided for reciprocating them to a closed position and to an open position. The dial driving means is synchronized with the reciprocating drive means to move the dial while the tool holders and stripper blocks are in open position. The tool holders are provided with a number of punches or other tools corresponding in number to the number of die pockets in the dial, so that at each closing of the tool holders, a separate operation may be performed on a nut blank in each pocket. Suitable means are provided for automatically feeding the blanks to the dial at the first station, the feeding mechanism being actuated upon each movement of the reciprocating parts of the machine to feed one blank, and means are provided for ejecting the finished blank from the dial.

The machine is also provided with suitable safety means for automatically disengaging the dial from the drive mechanism upon breakage of any of the punches, or displacement of the blanks from the die pockets together with means for returning the dial to its last operating position so that the dial pockets will be in alignment with the punches, and injury to the apparatus will be prevented.

The machine described above is the subject matter of the co-pending application filed by Malcolm H. Ames and me, Serial No. 287,828, filed June 23, 1928, of which this application is a division. The claims of the present application are directed to the dial arrangement and its associated parts.

In the accompanying drawings I have shown one form of the invention.

Figure 2:
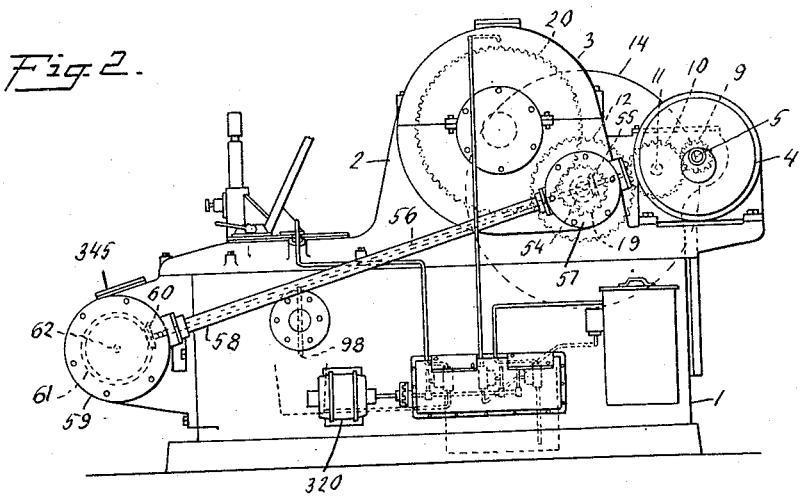
Figure 9:
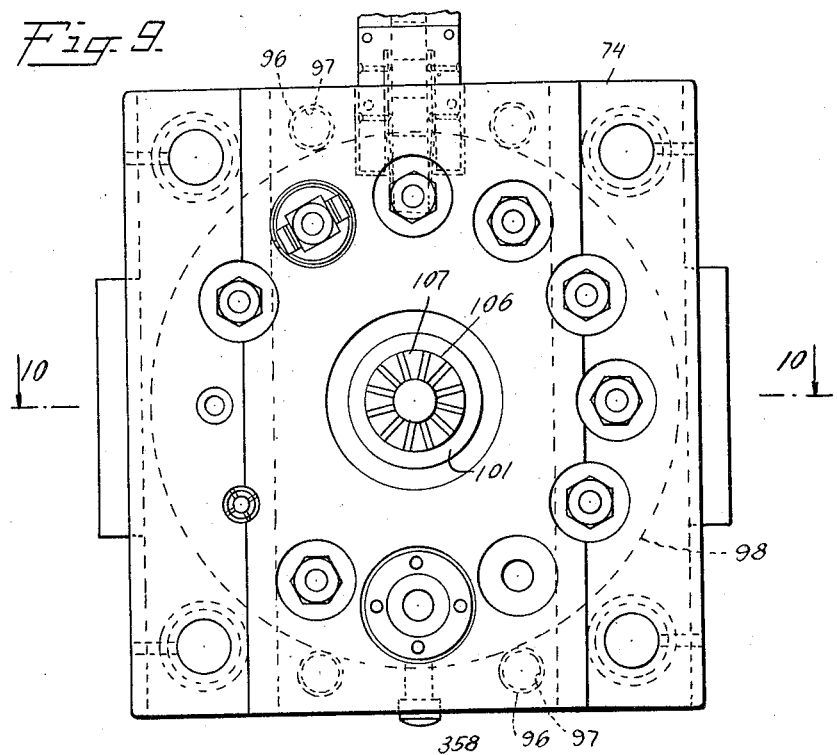
Figure 10:
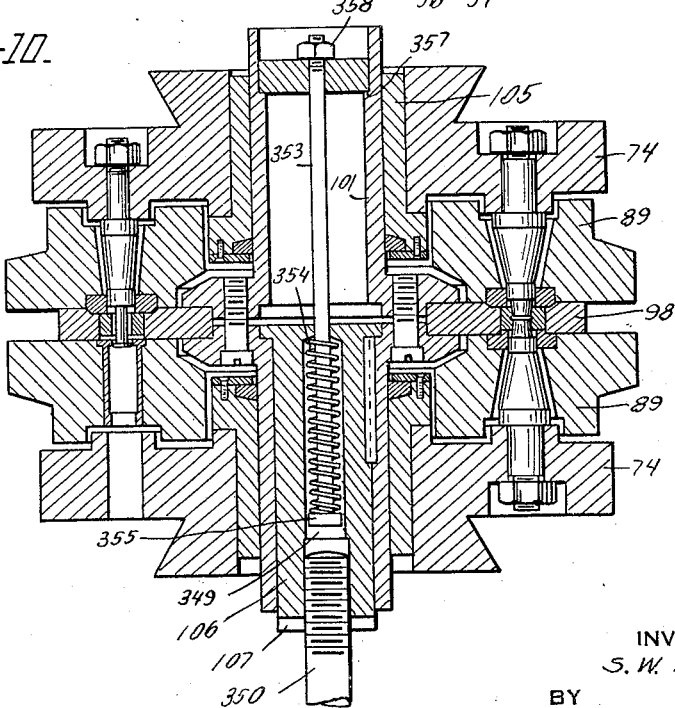

In the drawings:

Fig. 1 is a plan view;
Fig. 2 is a side elevation;
Fig. 3 is a vertical, sectional view on line 3—3 of Fig. 1 on an enlarged scale;
Fig. 4 is a plan view on the same scale as Fig. 3 with the top casting removed, and with parts broken away for clearness;
Fig. 5 is a front elevation of an index clutch and dial control;
Fig. 6 is a plan view of the index clutch, with parts shown in section;
Fig. 7 is a side elevation of the index clutch, parts being shown in section;
Fig. 8 is a vertical, sectional view on lines 8—8 of Figs. 5 and 6;
Fig. 9 is a front elevation of the tool block assembly; and
Fig. 10 is a horizontal, sectional view on the lines 10—10 of Fig. 9.

Referring to the drawings, the reference numeral 1 designates the lower portion of the main housing. The upper portion 2 is arranged over the lower portion of the housing and provided with a cover 3. The machine is driven by means of a motor 4 (see Fig. 1) arranged at one end of the machine and supported on the upper section 2 of the housing. The motor is provided with a motor shaft 5. The motor shaft 5 carries a coupling 6, connected to a stub shaft 7, mounted in a housing 8. A pinion 9 (see Fig. 2) is mounted on this stub shaft and drives an intermediate gear or pinion 10 mounted on an intermediate shaft 11. The gear 10 meshes with a gear 12 mounted on the main drive shaft 13. The drive shaft is provided with a fly wheel 14 and with an electric clutch 15 (see Fig. 1). A brake drum 16 is mounted on the shaft beyond the electric clutch and is adapted to be engaged by a brake band 17 controlled by a magnet or solenoid 18. The drive shaft 13 is also provided with a pair of pinions 19 each of which meshes with a gear 20 mounted on a crank shaft 21. The crank shaft 21 drives a crank arm 22 (see Fig. 3) which is connected to a vertical, reciprocating slide 23. This slide works in upper and lower guide members consisting of castings 24 and 25 carried by the upper and lower castings 2 and 1, respectively. The castings 24 and 25 may be provided with wear plates or facings 26 adapted to be engaged by the slide. Intermediate its ends the slide is provided with a rectangular opening for the reception of a pair of bearing blocks 28. These bearing blocks are adjustable by means of a wedge 29 having suitable adjusting means 30. Each side of the slide is provided with a pair of bearings 31 (see Fig. 4) adapted to receive a pin 33. A link 34 is carried by each of the pins 33. As shown, the link is provided with an opening adjacent its end for the reception of the pin and a bushing 32 which surrounds the pin. The end of the link is rounded and adapted to be received in a concave recess in the bearing block 28. One of the links 34 is connected to a rear slide 35 which is adapted to reciprocate on a suitable bed at right angles to the vertical slide 23. The bottom of the slide 35 engages a wear plate 36 and one side of the slide engages a portion of the housing. The other side engages a wedge-shaped wear plate 37, thus permitting adjustment and alignment of the slide. The face of the slide is recessed to receive a bearing block 38 having a concave face and the end of the link 34 is rounded to engage the face of the bearing block. This end of the link is provided with an opening adapted to receive a bushing 40. A pin 39 extends through the bushing 40 and is received in bearings in the side walls of the rear slide 35. The bearing block 38 is also provided with an adjusting wedge 41 having suitable adjusting means 42.

The other link 34 is similarly connected to a center slide 43 which is also recessed as herebefore described for the reception of a bearing block 44. The bearing block 44 is adjustable by means of a wedge 45 and wedge adjusting means 46. The bearing block 44 is shaped similar to the bearing block 38 and is also adapted to be engaged by the rounded end of the link 34. The link is also provided with an opening to receive a bushing in which is mounted a pin 47 which is received in bearings in the side walls of the center slide. By providing the bearing blocks 28, 38 and 44 the thrust of the drive from the vertical slide 23 to the rear slide 35 and center slide 43 is taken off the pins 33, 40 and 47 and transmitted through the bearing blocks and the links to the slides. The bearing blocks may be adjusted when necessary, through their respective wedges to retain the rounded ends of the links 34 in contact with the concave faces of the bearing blocks so that the thrust is conveyed through the bearing blocks to the slides.

A front slide 48 is connected to the rear slide 35 to reciprocate therewith. The center slide is provided with openings adjacent each corner through which pass tie rods 49 and these tie rods are surrounded by tubes 50. These tubes enter openings in the front and rear slides and engage shoulders 51 formed by a reduction in the size of the opening. The rods extend through the reduced portion of the openings as indicated at 52 in Fig. 4 of the drawings and are provided with nuts 53 on their ends. The front and rear slides are thus tied together by the rods 49 and tubes 50. Before assembling the rods 49 are heated, and they are placed in the tubes 50 and tied together while still hot. The rods contract on cooling and the tubes are thus placed under an initial compression equal to the force applied to the punches carried by the slides.

The main drive shaft 13 is also provided with a bevel gear 54 (see Fig. 2) meshing with a bevel gear 55 on a shaft 56. The end of the main shaft and the gears 54 and 55 are mounted in a housing 57. The shaft 56 extends downwardly at an angle through a housing 58 into a housing 59 at the front of the machine. The lower end of shaft 56 is provided with a bevel gear 60 meshing with a bevel gear 61 mounted on a cam shaft 62. The opposite end of the shaft 62 is provided with a pinion 63 meshing with a gear 64 on a shaft 65 (see Fig. 4).

The center slide 43 and the front slide 48 are provided with tool holders 74. The tool holders are mounted on the slides by means of a tongue and groove and are capable of being adjusted to properly center them.

A stripper block 89 is mounted in front of each of the tool holders. Each of the stripper blocks is provided with a plurality of concentric openings, preferably four in number, and a supporting stud passes through each of these openings and is received in an aligned opening in the tool holder. The adjacent faces of the stripper block and tool holder are also provided with recesses 96 for the reception of coil springs which tend to move the tool holder and stripper block away from each other.

A dial 98 is arranged between the pair of stripper blocks (see Fig. 3). The dial is provided with a central opening and is adapted to be received in a groove formed by the adjacent faces of flanges carried by sleeves 101, passing through the tool holders and stripper blocks. The flanged ends of the sleeves are secured to each other in any suitable manner. Each of the sleeves 101 is surrounded by a sleeve or bearing 105 which forms a support for the dial and sleeves 101. Within one of the sleeves 101 there is provided a clutch member 106 which is keyed thereto (see Fig. 10). The clutch member is provided with clutch teeth 107 on its outer end which are adapted to engage similar clutch teeth 108 on a second clutch member 109 (see Fig. 3). The clutch member 109 extends through the front slide and is connected to a sleeve 110 by means of a key 111 (see Fig. 8). Surrounding the sleeve 110 is a second sleeve 112 connected thereto by a key 113 and extending outwardly beyond it. This sleeve carries a disk 114 to which is riveted a ring 115. A hub is arranged between the disk 114 and ring 115. This hub carries a plurality of keys 116, which fasten the disk and ring to each other. The ring 115 is provided with a plurality of depressions 117 in its outer face. A ring 118 is mounted in front of the ring 115 and is bolted to a hub 119 by bolts 120. The hub 119 is provided with a sleeve 121 which abuts the outer end of the sleeve 110 and is free to revolve on the clutch member 109. The inner face of the ring 118 is provided with projections 122 which are adapted to be received in the depressions 117 to drive the ring 115, its associated parts, and the clutch member 109 under normal conditions. The projections 122 are normally retained in the depressions 117 by a coil spring 123 which surrounds the sleeve 110 and one end of which bears against the rear end of the sleeve 112. The other end of the coil spring 123 engages a washer 124 which abuts against the wall of a bearing 125 carried by a supporting casting 126. The bearing member 125 carries a bearing sleeve 127 which is engaged by the revolving sleeve 112. Adjacent the rear of the bearing member 125 the clutch member 109 is provided with an enlargement 128 and a bearing disk 129 is arranged between the bearing member 125 and this enlargement. The outer end of the clutch member is reduced in cross-section and threaded for the reception of a nut 130.

The outer face of the ring 118 is provided with a plurality of spaced concentrically arranged pins 131 carrying rollers 132. These rollers cooperate with a drive wheel or cam 133 carried by the shaft 62 (see Fig. 4). As shown the cam 133 is provided with a thread 134 which extends in the same vertical plane throughout the greater portion of the circumference of the cam and is then offset as at 135, so that the ring 118 and its associated parts will be moved the distance between two of the rollers 132 upon each revolution of the shaft 62, and will impart a step by step movement to the ring 118.

The step by step movement of the ring 118 and the asociated clutch member 109 is transmitted through the clutch member 106 to the dial 98 to successively bring each of the dial openings into position for successive operations.

Means are provided for returning the dial to its last station, in case of the breakage of a punch or the displacement of one of the blanks from the pocket of the dial, to prevent the tool holders and stripper blocks from closing and thus causing damage or breakage to the dial or punches. The supporting casting 126 carries a ring 270 (see Figs. 5 to 8) which is supported by a pair of rollers 271 and by a plate 272 carried by a lug or post 273 mounted on the casting 126. This ring is provided with an internal arcuate recess 274 for the reception of a coil spring 275. One end of this spring bears against a post 276 carried by the supporting casting 126. The opposite end of the spring engages a shoulder 277 formed at the end of the recess 274. The ring 270 is provided with a shoulder 278 adapted to be engaged by slide 279 mounted in a housing 280 carried by the casting 126. This slide is normally spring pressed into engagement with the shoulder 278 by a coil spring 281 carried in a recess in the rear end of the slide 279 and engaging the back of the housing 280.

If the dial binds, due to displacement of a nut blank from one of the pockets, or due to the breakage of a punch, or due to improper removal of the head of the trimming punch after a breakage, the projections 122 carried by the ring 118 ride out of the depressions 117 in the ring 116. As the ring 118 is incapable of lateral movement due to the engagement of its hub 121 with the end of the sleeve 110, the ring 115, ring 116, disk 114 and hub 112 are moved back against the tension of the spring 123. During this movement, the disk 114 engages a roller 285 carried by a lever 286 pivotally mounted on the casting 126 and this lever is connected by a pin 287 to one arm of a bell crank lever 288. The other arm of this bell crank lever projects into the housing 280 and enters a slot 289 in the slide 279. A pawl 290 is pivotally mounted on a pin 291 carried by the ring 270 and this pawl is provided with an extension 292 engaged by the slide 279. A coil spring 293 engages the opposite side of the extension 292 and is adapted to move the pawl to an operative position. The pawl is provided with a tooth 294 adapted to engage ratchet teeth 295 on the ring 115. When the bell crank lever 288 is actuated, the slide is moved backwardly into the housing against the tension of the spring 281 and disengages the shoulder 288. This permits the spring 275 which is under tension, to move the ring 270 in a counter clock-wise direction. At the same time, the movement of the slide frees the pawl 290, and the spring 293 causes the pawl to engage one of the ratchet teeth 295 on the ring 115, to prevent further movement of the dial and associated parts in a forward direction and to return dial to the initial position of the cycle through action of spring 275. A holding pawl 296 is provided on the supporting casting and is maintained in an operative position by a coil spring 297. This pawl is provided with a locking tooth 298 adapted to engage ratchet teeth 299 formed on the periphery of the disk 114. This pawl functions to stop the dial at the starting point of the cycle and align the die pockets with the punches and other tools.

Means are provided for de-energizing the motors upon disengagement of the index clutch. As shown (see Figs. 5 and 6), a pin 340 is carried by the slide 279 and projects through a slot 341 in the housing 280. The end of this pin rides in a slot in a crank arm 342 and this arm is carried by a shaft 343. The shaft 343 projects through the end wall of the lower casting and controls an electric switch 344 (see Fig. 4). When the slide is reciprocated in the housing the shaft 343 is rotated, opening the switch 344 and disconnecting the motors 4 and 320. The switch 344 also controls the electric clutch 15 and de-energizes the solenoid 18 to apply the brake band 17 to the brake drum 16.

Access may be had to the interior of the front end of the machine through a removable cover plate 345 to reset the index clutch. As shown, the ring 270 is provided with a boss 346 having a socket 347 for the reception of a suitable operating handle or tool to permit the ring to be turned in a clockwise direction against the tension of the spring 275 until the shoulder 278 passes the slide 279 when the slide will be projected by the spring 281 to engage the shoulder 278 and release the pawl, 290.

The removal of the cover plate 345 also permits access to the means for retaining the dial 98 and the sleeves 101 in assembled position. As shown, (see Fig. 10) the clutch member 106 is provided with a central opening 349 adapted to receive the threaded end of a rod 350 which extends through a central opening in the clutch member 109 and is provided with an enlargement 351 adjacent its outer end adapted to engage a shoulder formed adjacent the end of this opening (see Fig. 8). Beyond the enlargement the rod is provided with a head 352 for the reception of a suitable tool by means of which the threaded end of the rod may be released to disassemble the dial and its associated parts. The sleeve 101 on the opposite side of the dial is connected to the clutch member 106 by means of a rod 353 which extends through a reduced portion of the central opening 349 in the clutch member 106 and is surrounded by a coil spring 354. One end of this spring engages a shoulder formed by the reduction of the opening and the other end engages a nut or head 355 on the end of the rod 353. The other end of the rod passes through a retaining block 356 arranged within the sleeve 101 and engaging a shoulder 357 in the sleeve to limit its inward movement. Rod 353 and spring 354 are provided to permit an end chase of about $\frac{1}{32}''$ to the dial to insure equalized clamping of the dial between the stripper blocks. When the rod 350 is released, the clutch teeth 107 and 108 may be disengaged and the dial and associated parts may be removed by unfastening the tool holders from the front and outer slides in the manner heretofore described. When the slides are opened, the end of the sleeves 101 are within the space between the slides, and the entire assembly may be removed through the opening normally closed by the cover plate 162. The dial may be removed from the assembly by loosening nut 358 and removing the rod 353.

The operation of the machine will be apparent from the foregoing description. The tool holders 74 are reciprocated with the front slide 48 and the center slide 43 from the crank shaft 21 through the connections described. A step by step rotary movement is imparted to the dial 98 through shaft 62 driving cam 133 and rollers 132 carried by the ring 118. The step by step movement of the ring 118 and the associated clutch member 109 is transmitted through the clutch member 106 to the dial 98 to successfully bring each of the dial openings into successive positions in alignment with the punches or other tools carried by the tool holders.

If a punch is broken or if one of the blanks from a pocket of the dial becomes displaced, the dial is automatically returned to its last station to prevent breakage of the dial or punches by the closing of the tool holders. If the dial binds the projections 122 of ring 118 ride over the depressions 117 in the ring 116. The ring 115, ring 116, disc 114 and hub 112 are then moved back against the tension of spring 123. Disc 114 then engages roller 285 moving the lever 286 on its pivot. This swings the bell crank lever 288 on its pivot and withdraws the slide 279 from engagement with the shoulder 278 of ring 270. The ring 270 is then revolved in a reverse direction by spring 275. Pawl 290 is released by the slide 279 and engages ratchet teeth 295 of the ring 215 to prevent further movement of the dial in a forward direction. When the dial is moved in a reverse direction by the spring 275, holding pawl 296 engages ratchet teeth 299 formed on the periphery of the disc 114 to stop the dial at the starting point of the cycle and align the die pockets with the punches and other tools.

I claim:

1. A safety device for drive mechanisms comprising a rotatably mounted ring, a coil spring mounted in said ring and normally retained under compression, a locking member engaging said ring, a pawl normally retained in an inoperative position by said locking member, means for releasing said locking member when the drive mechanism is disconnected whereby said ring is rotated in a reverse direction by said spring and said pawl assumes an operative position, and ratchet teeth formed on the driven member and adapted to be engaged by said pawl.

2. A safety device comprising a spring pressed driven ring, a drive ring having interlocking engagement with said driven ring, said rings being adapted to be disengaged when the pressure of said spring is overcome, means actuated by the disengagement of said rings to rotate said driven ring in a reverse direction, and a locking pawl adapted to prevent further reverse movement of said driven ring when it has returned to its initial position.

3. A safety device comprising spring pressed drive means, driven means connected thereto, means for returning said driven means to its starting position upon disengagement of said drive means, said means comprising a ring, a spring mounted in said ring and normally maintained under compression, a pawl mounted on said ring and normally maintained in an inoperative position, means actuated by the disengagement of said drive means and said driven means to release said spring and permit said pawl to assume an operative position, ratchet teeth carried by said drive means and adapted to be engaged by said pawl, and means for resetting said returning means.

4. In a machine of the character described, a safety device comprising an interlocking drive ring and driven ring, a spring normally retained under compression, means controlled by the disengagement of said drive ring and said driven ring for releasing said spring, and a locking member actuated by the release of said spring.

In testimony whereof I affix my signature.

SAMUEL W. AVIS.